United States Patent [19]
Flotow et al.

[11] Patent Number: 5,099,973
[45] Date of Patent: Mar. 31, 1992

[54] SELF-CONTAINED FRICTION CLUTCH WITH LOW INERTIA DRIVEN DISC

[75] Inventors: Richard A. Flotow, Butler, Ind.; Orville E. Phelps, Taipei, Taiwan

[73] Assignee: Dana Corporation, Toledo, Ohio

[21] Appl. No.: 618,536

[22] Filed: Nov. 27, 1990

Related U.S. Application Data

[63] Continuation of Ser. No. 516,324, Apr. 30, 1990, abandoned.

[51] Int. Cl.$^5$ .............................................. F16D 13/66
[52] U.S. Cl. ............................ 192/70.12; 192/107 R; 192/113 A
[58] Field of Search ............ 192/70.11, 70, 12, 70.14, 192/107 R, 113 A

[56] References Cited

U.S. PATENT DOCUMENTS

| | | | |
|---|---|---|---|
| 474,183 | 5/1892 | Neuert. | |
| 804,104 | 11/1905 | Dion | 192/107 R |
| 1,137,939 | 5/1915 | Wern | 192/101 |
| 1,157,793 | 10/1915 | Metten. | |
| 1,480,239 | 1/1924 | Chaplin | 192/107 X |
| 2,164,897 | 7/1939 | Brewer | 192/13 R |
| 2,171,837 | 9/1939 | Morton et al. | 192/105 C X |
| 2,259,461 | 10/1941 | Eason | 192/107 R |
| 2,303,201 | 11/1942 | Eason | 192/107 R |
| 2,827,142 | 3/1952 | Aschauer | 192/88 A |
| 3,583,537 | 6/1971 | Spannagel | 192/70.13 |
| 3,739,896 | 6/1973 | Shono | 192/70.27 |
| 3,770,088 | 11/1973 | Shono | 192/70.27 |
| 4,036,338 | 7/1977 | Linn et al. | 192/13 R |
| 4,280,608 | 7/1981 | Labuda et al. | 192/113 B |
| 4,470,485 | 9/1984 | Warwick | 192/113 A X |
| 4,556,133 | 12/1985 | Huber | 192/70.16 |
| 4,576,266 | 3/1986 | Schilling et al. | 192/70.12 |
| 4,650,050 | 3/1987 | Alas et al. | 192/70.12 |
| 4,655,333 | 4/1987 | Martinez-Corral | 192/70.27 |
| 4,662,497 | 5/1987 | Cucinotta et al. | 192/70.28 |
| 4,724,942 | 2/1988 | Casse et al. | 192/70.12 |
| 4,811,826 | 3/1989 | Kittel et al. | 192/70.13 |
| 4,817,775 | 4/1989 | Baccalaro et al. | 192/89 B |

Primary Examiner—Leslie A. Braun
Assistant Examiner—Whitelaw, Nicholas
Attorney, Agent, or Firm—MacMillan, Sobanski & Todd

[57] ABSTRACT

A self-contained friction clutch having a low inertia driven disc assembly is disclosed. The clutch includes a cover having a friction plate secured thereto in spaced apart fashion. The cover and the friction plate are secured to a flywheel as a unit, with the friction plate being disposed adjacent to the flywheel. Radial and circular grooves are formed in the face of the flywheel adjacent to the friction plate to permit cooling air to flow therebetween. A pressure plate is disposed between the cover and the friction plate for rotation therewith and axial movement relative thereto. Friction pads are secured to the adjacent faces of the friction plate and the pressure plate. A driven disc assembly is disposed between the friction plate and the pressure plate. The driven disc assembly includes a support plate extending between the pads secured to the friction plate and the pressure plate. When the clutch is engaged, the friction pads on the friction plate and the pressure plate frictionally engage the support plate for rotation therewith. The support plate may have a curled outer peripheral edge to increase the stiffness thereof.

24 Claims, 3 Drawing Sheets

SELF-CONTAINED FRICTION CLUTCH WITH LOW INERTIA DRIVEN DISC

CROSS-REFERENCE TO RELATED APPLICATIONS

This application is a continuation of Ser. No. 07/516,324; filed Apr. 30, 1990 now abandoned.

BACKGROUND OF THE INVENTION

This invention relates in general to friction clutches and in particular to a self-contained clutch including a low inertia driven disc.

Clutches are well known devices which are used to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A shift lever assembly is provided for selectively moving the pressure plate back and forth in the axial direction.

A driven disc assembly is disposed within the clutch between the pressure plate and the flywheel. The driven disc assembly is carried on an output shaft of the clutch, which is also the input shaft to the transmission. When the pressure plate is moved toward the flywheel, the driven disc assembly is frictionally engaged therebetween so as to cause the output shaft of the clutch to rotate with the flywheel, the cover, and the pressure plate. In this manner, the clutch is engaged to transmit power from the engine to the transmission to drive the vehicle. When the pressure plate is moved away from the flywheel, the driven disc assembly is released from such frictional engagement so as to disconnect this driving connection. The clutch is typically disengaged to permit a gear shifting operation to occur within the transmission.

The transmission is often provided with a conventional synchronizer. The synchronizer is typically mounted on the input shaft of the transmission for rotation therewith and includes one or more friction surfaces. When the clutch is disengaged and a shifting operation is about to occur, the synchronizer friction surface engages a corresponding surface formed on a selected transmission gear so as to synchronize the rotational speeds of the input shaft and the selected gear. Such speed synchronization is necessary to prevent undesirable clashing of the gear teeth during the shifting operation. Because of the relatively large inertia of the various rotating gears within the transmission, the synchronizer primarily alters the rotational speed of the input shaft of the transmission to correspond with the rotational speed of the selected transmission gear when a shifting operation is about to occur.

However, as mentioned above, the driven disc assembly is usually mounted on the input shaft of the transmission for rotation therewith. As a result, the inertial load applied to the synchronizer during frictional engagement with the selected transmission gear is determined by the sum of the weight of the input shaft and the weight of the driven disc assembly. The additional weight of the driven disc assembly causes increased wear on the synchronizer and can also affect the overall quality of the shifting operation. Thus, it is desirable to maintain the weight of the driven disc assembly at a minimum, while still providing satisfactory performance.

SUMMARY OF THE INVENTION

This invention relates to a self-contained friction clutch having a low inertia driven disc assembly. The clutch includes a cover having a friction plate secured thereto in spaced apart fashion. The cover and the friction plate are secured to a flywheel as a unit, with the friction plate being disposed adjacent to the flywheel. Radial and circular grooves are formed in the face of the flywheel adjacent to the friction plate to permit cooling air to flow therebetween. A pressure plate is disposed between the cover and the friction plate for rotation therewith and axial movement relative thereto. Friction pads are secured to the adjacent faces of the friction plate and the pressure plate. A driven disc assembly is disposed between the friction plate and the pressure plate. The driven disc assembly includes a support plate extending between the pads secured to the friction plate and the pressure plate. When the clutch is engaged, the friction pads on the friction plate and the pressure plate frictionally engage the support plate for rotation therewith. The support plate may have a curled outer peripheral edge to increase the stiffness thereof.

It is an object of this invention to provide a self-contained friction clutch including a low inertia driven disc assembly.

It is another object of this invention to provide such a self-contained friction clutch having a friction plate for protectively covering a flywheel engagement surface.

It is a further object of this invention to provide such a self-contained friction clutch having improved cooling capabilities.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
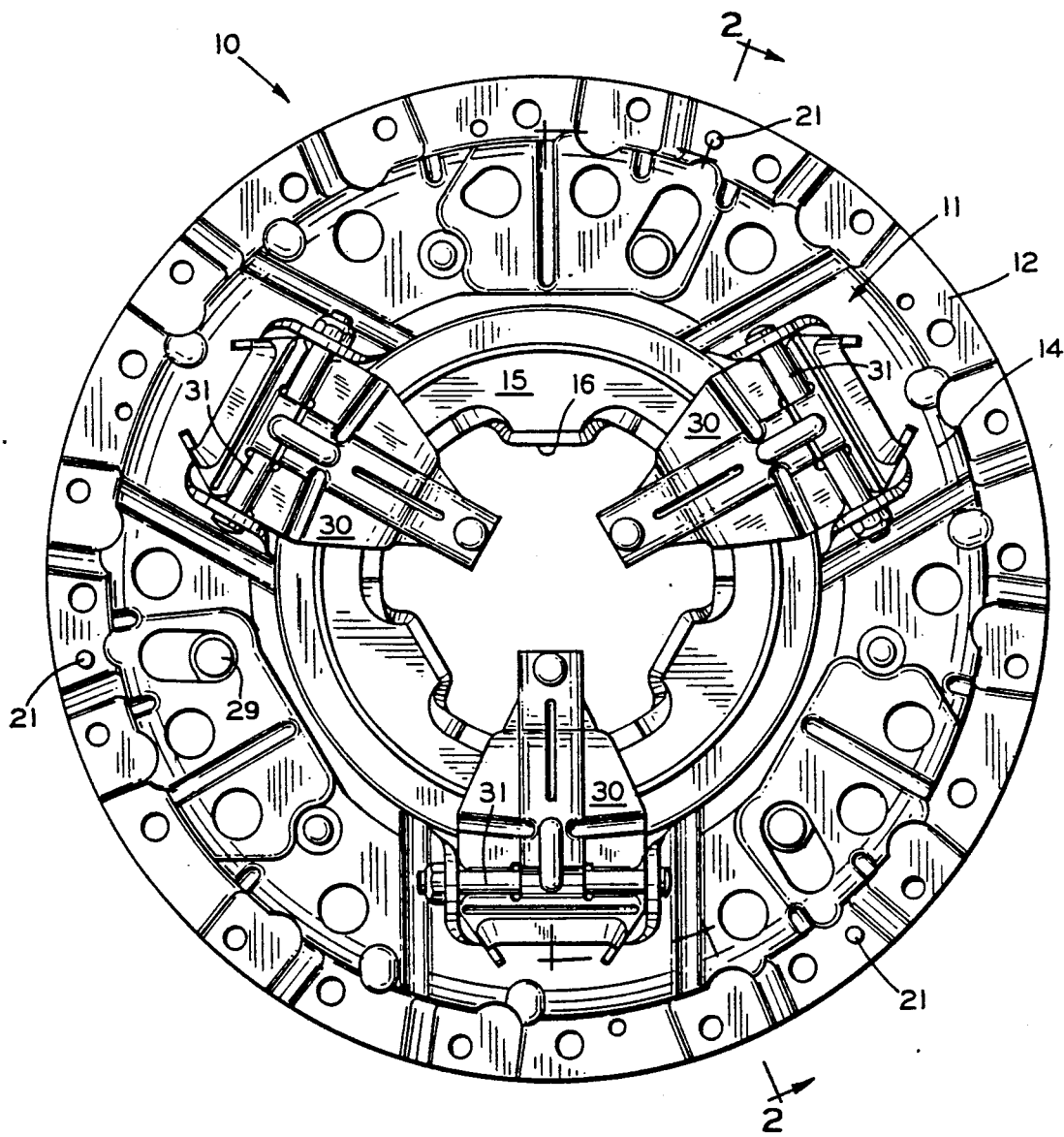
FIG. 1 is an end elevational view of a portion of a self-contained friction clutch in accordance with this invention.

Referring now to the drawings, there is illustrated in FIG. 1 the cover assembly portion of a friction clutch, indicated generally at 10, in accordance with this invention. The clutch 10 includes a generally annular cover, indicated generally at 11, which is adapted to rotate about a central axis. The cover 11 is formed having a radially outwardly extending flange portion 12, an axially extending rim portion 13, and a radially inwardly extending end wall portion 14. The end wall portion 14 is provided with a plurality of radially inwardly extending ramp portions 15. A central opening 16 through the cover 11 is defined by the ramp portions 11. The opening 16 is co-axially aligned with the axis of rotation of the clutch 10.

An annular friction plate 20 is connected to the flange portion 12 of the cover 11 by a plurality of rivets 21. The flange portion 12 of the cover 11 and the friction plate 20 are secured to a flywheel 22 by a plurality of threaded bolts 23 (see FIG. 2). As is well known, the flywheel 22 is connected to a crankshaft 24 or similar rotational driving means. Thus, the flywheel 22, the friction plate 20, and the cover 11 all rotate together during use. One or more conventional friction pads 25 are connected to the side of the friction plate 20 which faces toward the cover 11 by rivets or similar means. The function of these friction pads 25 will be explained in detail below.

A pressure plate 26 is disposed between the cover 11 and the friction plate 20, adjacent to the end wall portion 14. A plurality of raised boss portions 27 are formed on the side of the pressure plate 26 which faces toward the cover 11. One or more conventional friction pads 28 are connected to the side of the pressure plate 26 which faces away from the cover 11 by rivets or similar means. The functions of the boss portions 27 and the friction pads 28 will be explained in detail below. The pressure plate 26 is connected to the cover 11 by conventional drive straps 29 or other means for rotation therewith, while permitting limited axial movement relative thereto. The drive straps 29 also serve to resiliently urge the pressure plate 26 toward the cover 11.

Figure 2:
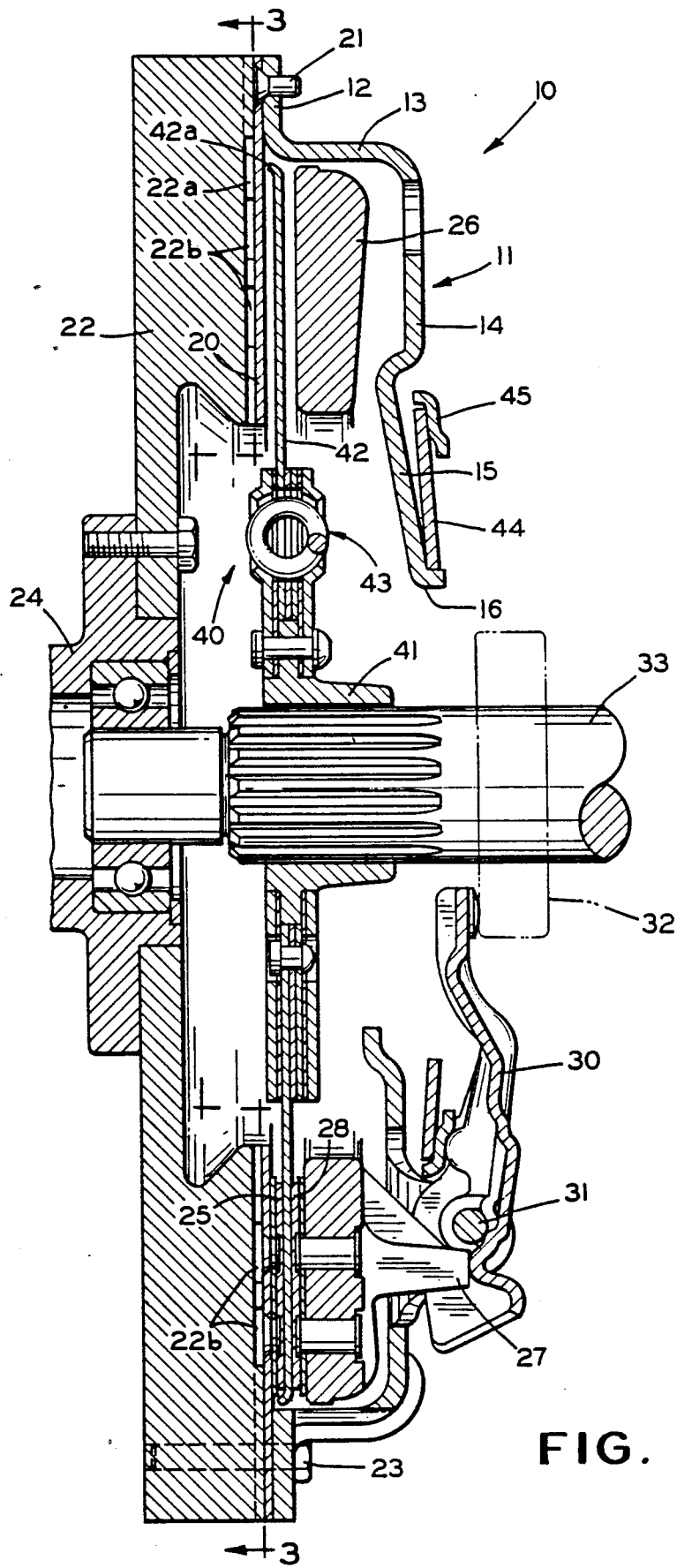
FIG. 2 is a sectional elevational view taken along line 2—2 of FIG. 1 of the entire clutch.

A lever operating mechanism is provided for selectively moving the pressure plate 26 away from the cover 11 and toward the friction plate 20. The mechanism includes a plurality of radially extending levers 30 which are pivotably connected to the end wall portion 14 of the cover 11 by respective pivot pins 31. The outer ends of the levers 30 engage the boss portions 27 formed on the pressure plate 26. The inner ends of the levers 30 engage a conventional release bearing 32. The release bearing 32 is disposed about an output shaft 33 of the clutch 10. As best shown in FIG. 2, movement of the release bearing 32 toward the right causes the levers 30 to pivot about the pivot pins 31, thereby moving the outer ends of the levers 30 and the pressure plate 26 toward the left. When the release bearing 32 is moved toward the left, the pressure plate 26 is pulled back toward the right under the urging of the drive straps 29, as described above.

A driven disc assembly, indicated generally at 40, is splined onto the output shaft 33 of the clutch 10. The driven disc assembly 40 includes a central hub 41, which is splined onto the output shaft 33, and a support plate 42, which is mounted about the hub 41 for limited rotation relative thereto. A conventional spring dampening mechanism, indicated generally at 43, provides a rotational driving connection between the support plate 42 and the hub 41. The support plate 42 extends radially outwardly between the friction pads 25 and 28 carried on the friction plate 20 and the pressure plate 26, respectively. The outer peripheral edge of the support plate 42 is slightly curved toward the friction plate 20, as shown as 42a, for reasons which will be explained below.

Thus, when the pressure plate 26 is moved toward the left as described above, the support plate 42 is clamped between the friction pads 25 and 28. As a result, the driven disc assembly 40 is frictionally engaged with the flywheel 22, the friction plate 20, and the cover 11 for rotation therewith. When the release bearing 32 is moved toward the left, the support plate 42 is disengaged, permitting relative rotation of the driven disc assembly 40. A Belleville spring 44 or similar resilient means is provided for normally urging the pressure plate 26 toward the left. The inner peripheral edge of the spring 44 is carried on the ramp portions 15 of the cover, while the outer peripheral edge engages the levers 30 through a conventional collector ring 45. As is well known in the art, the spring 44 reacts against the cover 11 to urge the inner ends of the levers 30 toward the right, thereby urging the pressure plate 26 toward the left.

Figure 3:
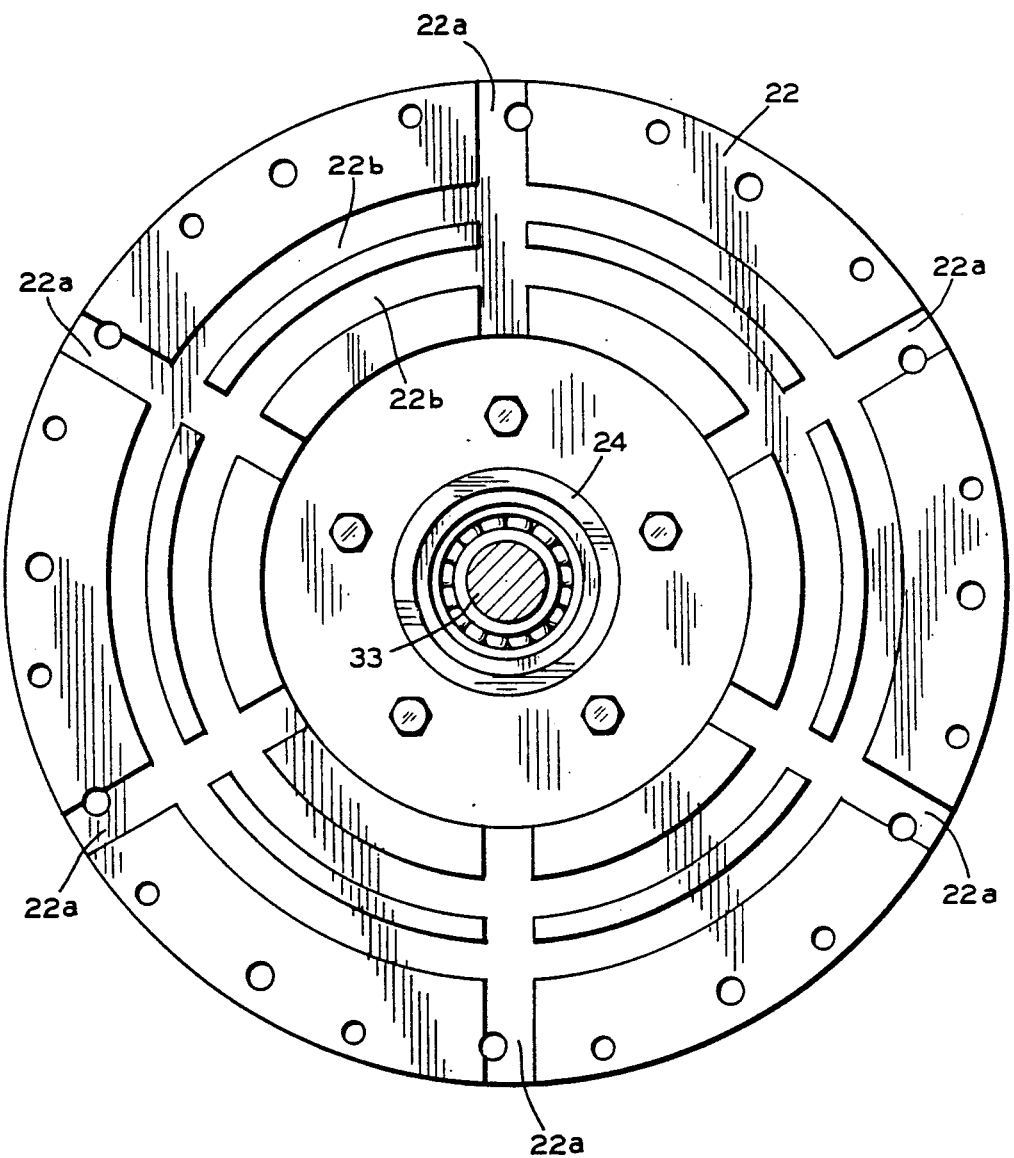
FIG. 3 is an end elevational view of the flywheel taken along line 3—3 of FIG. 2.

Referring now to FIG. 3, the side of the flywheel 22 which faces toward the friction plate 20 is illustrated. As shown therein, the surface of the flywheel 22 has a plurality of radially extending grooves 22a formed therein. The radial grooves 22a extend completely to the outer peripheral edge of the flywheel 22. Additionally, one or more circular grooves 22b are formed in the surface of the flywheel 22. Two concentric circular grooves 22b are shown in the illustrated embodiment. The grooves 22a and 22b permit air to flow between the friction plate 20 and the flywheel 22. This air flow promotes cooling of the friction plate 20, which becomes heated during use because of the frictional engagement with the support plate 42.

As discussed above, the support plate 42 is generally flat and annular in shape, having no friction pads secured thereto. Rather, the friction pads 25 and 28 are secured to the friction plate 20 and the pressure plate 26, respectively. This structure is desirable because it removes a large amount of weight from the support plate 42. Consequently, the inertia of the support plate 42 is markedly reduced, and the frictional engagement thereof causes much less wear than if a plurality of friction pads were secured to the support plate 42.

Another advantage to providing the friction pads 25 and 28 on the friction plate 20 and the pressure plate 26, respectively, is that the number of such friction pads 25 and 28 (as well as the material used therein) may be changed as desired without affecting the weight and inertia of the support plate 42 and, hence, the driven disc assembly 40. This is important because the support plate 42 is connected through the hub 41 and the output shaft 33 to a transmission (not shown) or similar device. Since the driven disc assembly 40 is splined onto the output shaft 33 for rotation therewith, the transmission must be designed to accommodate the rotational characteristics of the driven disc assembly 40. Since the friction pads 25 and 28 are not mounted on the support plate 42, they may be changed without affecting the weight and inertia of the driven disc assembly 40.

For the reasons discussed above, it is desirable that no friction pads be secured to the support plate 42. However, in prior art driven disc assemblies, the attachment of the friction pads to the support plate did provide one advantage, namely, that they tended to stiffen the support plate and prevent warpage from occurring during use. Such warpage tends to occur because the support plate is subjected to relatively high temperatures and large forces when it is frictionally engaged. In order to prevent this from occurring with the friction plate 42, the outer peripheral edge thereof is curled, as shown at 42a. This curled edge 42a tends to stiffen the entire support plate 42 and prevent warpage from occurring.

The curled edge 42a of the support plate 42 may also function as a wear indicator for the clutch 10. As shown in FIG. 2, a predetermined axial distance is defined between the friction plate 20 and the curled edge 42a when the clutch 10 is engaged and the friction pads 25 and 28 are not worn. As wear occurs, the axial thickness of the friction pads 25 and 28 decreases, and the support plate 42 and the pressure plate 26 will be positioned increasingly closer to the friction plate 20 when the clutch 10 is engaged. Consequently, the predetermined axial distance between the friction plate 20 and the curled edge 42a will also decrease. When the thicknesses of the friction pads 25 and 28 has decreased a sufficient amount, the curled edge 42a of the support plate 42 will scrape the surface of the friction plate 20 when the clutch 10 is engaged. The noise generated by this scraping action will provide a clearly audible signal to the operator that the friction pads 25 and 28 should be replaced soon.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch assembly adapted to be connected to a flywheel comprising:
   a cover;
   a friction plate secured to said cover;
   a pressure plate disposed between said cover and said friction plate and connected thereto for rotation therewith and for axial movement relative thereto between engaged and disengaged positions;
   first and second friction pads secured to said friction plate and said pressure plate, respectively; and
   a driven disc assembly disposed between said friction plate and said pressure plate, said driven disc assembly including a support plate extending between said first and second friction pads such that said friction pads frictionally engage said support plate for rotation therewith when said pressure plate is moved to said engaged position, said support plate including an outer peripheral edge which is curled.

2. The invention defined in claim 1 further including means for connecting said cover and said friction plate to the flywheel for rotation therewith.

3. The invention defined in claim 2 wherein said means for connecting said cover and said friction plate to the flywheel includes a plurality of aligned apertures formed through said cover and said friction plate and a corresponding plurality of threaded fasteners extending through said aligned apertures.

4. The invention defined in claim 1 wherein said outer peripheral edge of said support plate is curled toward said friction plate.

5. A clutch assembly comprising:
   a cover;
   a friction plate;
   a flywheel having a surface, said cover and said friction plate being connected to said flywheel such that said friction plate is disposed adjacent said flywheel surface;
   a pressure plate disposed between said cover and said friction plate and connected thereto for rotation therewith and for axial movement relative thereto between engaged and disengaged positions;
   first and second friction pads secured to said friction plate and said pressure plate, respectively; and
   a driven disc assembly disposed between said friction plate and said pressure plate, said driven disc assembly including a support plate extending between said first and second friction pads such that said friction pads frictionally engage said support plate for rotation therewith when said pressure plate is moved to said engaged position, said support plate including an outer peripheral edge which is curled.

6. The invention defined in claim 2 further including a plurality of aligned apertures formed through said cover and said friction plate and a corresponding plurality of threaded fasteners extending through said aligned apertures into threaded engagement with said flywheel.

7. The invention defined in claim 5 wherein said outer peripheral edge of said support plate is curled toward said friction plate.

8. The invention defined in claim 5 further including a groove formed in said surface of said flywheel adjacent to said friction plate.

9. The invention defined in claim 8 wherein said groove extends radially to an outer peripheral edge of said flywheel.

10. The invention defined in claim 8 wherein said groove is annular in shape.

11. The invention defined in claim 5 further including a plurality of grooves formed in said surface of said flywheel adjacent to said friction plate.

12. The invention defined in claim 11 wherein all of said grooves extend radially to an outer peripheral edge of said flywheel.

13. The invention defined in claim 11 wherein all of said grooves are annular and are arranged concentrically.

14. The invention defined in claim 11 wherein some of said grooves extend radially to an outer peripheral edge of said flywheel and some of said grooves are annular and are arranged concentrically.

15. A clutch assembly comprising:
   a cover;
   a friction plate;
   a flywheel having a surface, said cover and said friction plate being connected to said flywheel such that said friction plate is disposed adjacent said flywheel surface, a groove being formed in said surface of said flywheel adjacent to said friction plate;
   a pressure plate disposed between said cover and said friction plate and connected thereto for rotation therewith and for axial movement relative thereto between engaged and disengaged positions;
   first and second friction pads secured to said friction plate and said pressure plate, respectively; and
   a driven disc assembly disposed between said friction plate and said pressure plate, said driven disc assembly including a support plate extending between said first and second friction pads such that said friction pads frictionally engage said support plate for rotation therewith when said pressure plate is moved to said engaged position.

16. The invention defined in claim 15 further including a plurality of aligned apertures formed through said cover and said friction plate and a corresponding plurality of threaded fasteners extending through said aligned apertures into threaded engagement with said flywheel.

17. The invention defined in claim 15 wherein said support plate includes an outer peripheral edge which is curled.

18. The invention defined in claim 17 wherein said outer peripheral edge of said support plate is curled toward said friction plate.

19. The invention defined in claim 15 wherein said groove extends radially to an outer peripheral edge of said flywheel.

20. The invention defined in claim 15 wherein said groove is annular in shape.

21. The invention defined in claim 20 further including a plurality of grooves formed in said surface of said flywheel adjacent to said friction plate.

22. The invention defined in claim 21 wherein all of said grooves extend radially to an outer peripheral edge of said flywheel.

23. The invention defined in claim 21 wherein all of said grooves are annular and are arranged concentrically.

24. The invention defined in claim 21 wherein some of said grooves extend radially to an outer peripheral edge of said flywheel and some of said grooves are annular and are arranged concentrically.

* * * * *

UNITED STATES PATENT AND TRADEMARK OFFICE
CERTIFICATE OF CORRECTION

PATENT NO. : 5,099,973

DATED : March 31, 1992

INVENTOR(S) : Richard A. Flotow and Orville E. Phelps

It is certified that error appears in the above-identified patent and that said Letters Patent is hereby corrected as shown below:

Column 6, line 7
Claim 6,                change "2" to -- 5 --.

Column 7, line 8,
Claim 21, Change "15" to --14--.

Signed and Sealed this

Twenty-ninth Day of June, 1993

Attest:

MICHAEL K. KIRK

*Attesting Officer*           *Acting Commissioner of Patents and Trademarks*